(12) United States Patent
Han et al.

(10) Patent No.: US 8,502,949 B2
(45) Date of Patent: Aug. 6, 2013

(54) DISPLAY PANEL AND DISPLAY APPARATUS HAVING THE SAME

(75) Inventors: Kyoung-Tai Han, Asan-si (KR); Eun-Guk Lee, Seoul (KR); Young-Goo Song, Asan-si (KR); Hyuk-Jin Kim, Asan-si (KR); Min-Wook Park, Asan-si (KR); Jong-In Kim, Suwon-si (KR); Hyo-Seop Kim, Cheonan-si (KR)

(73) Assignee: Samsung Display Co., Ltd., Yongin (KR)

( * ) Notice: Subject to any disclaimer, the term of this patent is extended or adjusted under 35 U.S.C. 154(b) by 231 days.

(21) Appl. No.: 13/084,182

(22) Filed: Apr. 11, 2011

(65) Prior Publication Data

US 2012/0140160 A1 Jun. 7, 2012

(30) Foreign Application Priority Data

Dec. 2, 2010 (KR) .................. 10-2010-0121747

(51) Int. Cl.
*G02F 1/1343* (2006.01)
*G02F 1/1333* (2006.01)
*G02F 1/133* (2006.01)

(52) U.S. Cl.
USPC ............... 349/144; 349/139; 349/84; 349/33

(58) Field of Classification Search
USPC .................... 349/144, 139, 84, 33
See application file for complete search history.

(56) References Cited

U.S. PATENT DOCUMENTS 7,199,808 B2 * 4/2007 Yo ................................. 345/694
7,480,014 B2 * 1/2009 Chae et al. ...................... 349/39

FOREIGN PATENT DOCUMENTS

| KR | 1020060099224 | 9/2006 |
| KR | 1020090132435 | 12/2009 |
| KR | 1020100060768 | 6/2010 |
| KR | 1020100068634 | 6/2010 |

\* cited by examiner

*Primary Examiner* — Mike Qi
(74) *Attorney, Agent, or Firm* — H.C. Park & Associates, PLC

(57) ABSTRACT

A display panel includes a first display substrate, a second display substrate, and a liquid crystal layer. The first display substrate includes a first base substrate having a plurality of display cells, a plurality of data lines, a plurality of gate lines, and a plurality of pixel electrodes. The data lines, the gate lines and the pixel electrodes are respectively separated in each of the display cells. The second display substrate includes a second base substrate, a light blocking pattern corresponding to the data lines and the gate lines, a common electrode facing the pixel electrodes, and a common line overlapping with the blocking pattern. The liquid crystal layer is disposed between the first and second display substrate.

20 Claims, 10 Drawing Sheets

DISPLAY PANEL AND DISPLAY APPARATUS HAVING THE SAME

CROSS REFERENCE TO RELATED APPLICATION

This application claims priority from and the benefit of Korean Patent Application No. 2010-121747, filed on Dec. 2, 2010, which is hereby incorporated by reference for all purposes as if fully set forth herein.

BACKGROUND OF THE INVENTION

1. Field of the Invention

Exemplary embodiments of the present invention relate to a display panel and a display apparatus having the display panel. More particularly, exemplary embodiments of the present invention relate to a display panel having a plurality of display cells and a display apparatus having the display panel.

2. Discussion of the Background

Generally, a tiled display apparatus includes a plurality of flat display panels connected with each other to effectively create a large screen size in a relatively small space.

The flat display panel has a display area in which an image is displayed, and a peripheral area in which a driving circuit for displaying the image is disposed. Accordingly, the peripheral area of the flat display panel may include a bezel width for outer lead bonding (OLB). As the flat display panels are connected with each other, the bezel width may be larger than about 7 mm.

The tiled display apparatus may have a frame border that may be colored black or gray. The border may divide the whole screen by the bezel width in the boundary of the display panels. Color and luminance near the frame border may not be well-controlled so the frame border may be recognized within the overall display. Thus, the display quality of the whole screen may be compromised.

SUMMARY OF THE INVENTION

Exemplary embodiments of the present invention provide a display panel having a plurality of display cells that may improve display quality.

Exemplary embodiments of the present invention also provide a display with display cells in a display substrate and a common line electrically connected to a common electrode on another display substrate with a frame border in the boundary having a narrow bezel width that enhances display quality by decreasing delay times of applying a common voltage.

Additional features of the invention will be set forth in the description which follows, and in part will be apparent from the description, or may be learned by practice of the invention.

An exemplary embodiment of the present invention discloses a display panel that comprises a first display substrate that comprises a first base substrate comprising a plurality of display cells, a plurality of data lines, a plurality of gate lines, and a plurality of pixel electrodes. The data lines, the gate lines, and the pixel electrodes are respectively separated in each of the display cells. The display panel also comprises a second display substrate that comprises a second base substrate, a light blocking pattern corresponding to the data lines and gate lines, a common electrode facing the pixel electrodes, and a common line overlapping the blocking pattern. The display panel additionally comprises a liquid crystal layer disposed between the first display substrate and the second display substrate.

An exemplary embodiment of the present invention also discloses a display apparatus that comprises a display panel comprising a first display substrate that comprises a first base substrate, a plurality of data lines, a plurality of gate lines, and a plurality of pixel electrodes. The first base substrate comprises a display area comprising a plurality of display cells and a peripheral area surrounding the display area, the data lines, the gate lines, and the pixel electrodes are respectively separated in each of the display cells. The display apparatus also comprises a second display substrate that comprises a second base substrate, a light blocking pattern, a common electrode, and a common line. The light blocking pattern corresponds to the data lines and the gate lines. The common electrode faces the pixel electrodes, and the common line overlaps with the blocking pattern. The display apparatus additionally comprises a plurality of driving parts arranged in the peripheral area of the display panel and configured to drive the pixel electrodes of each of the display cells.

It is to be understood that both the foregoing general description and the following detailed description are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this specification, illustrate embodiments of the invention, and together with the description serve to explain the principles of the invention.

DESCRIPTION OF ILLUSTRATED EMBODIMENTS

Figure 1:
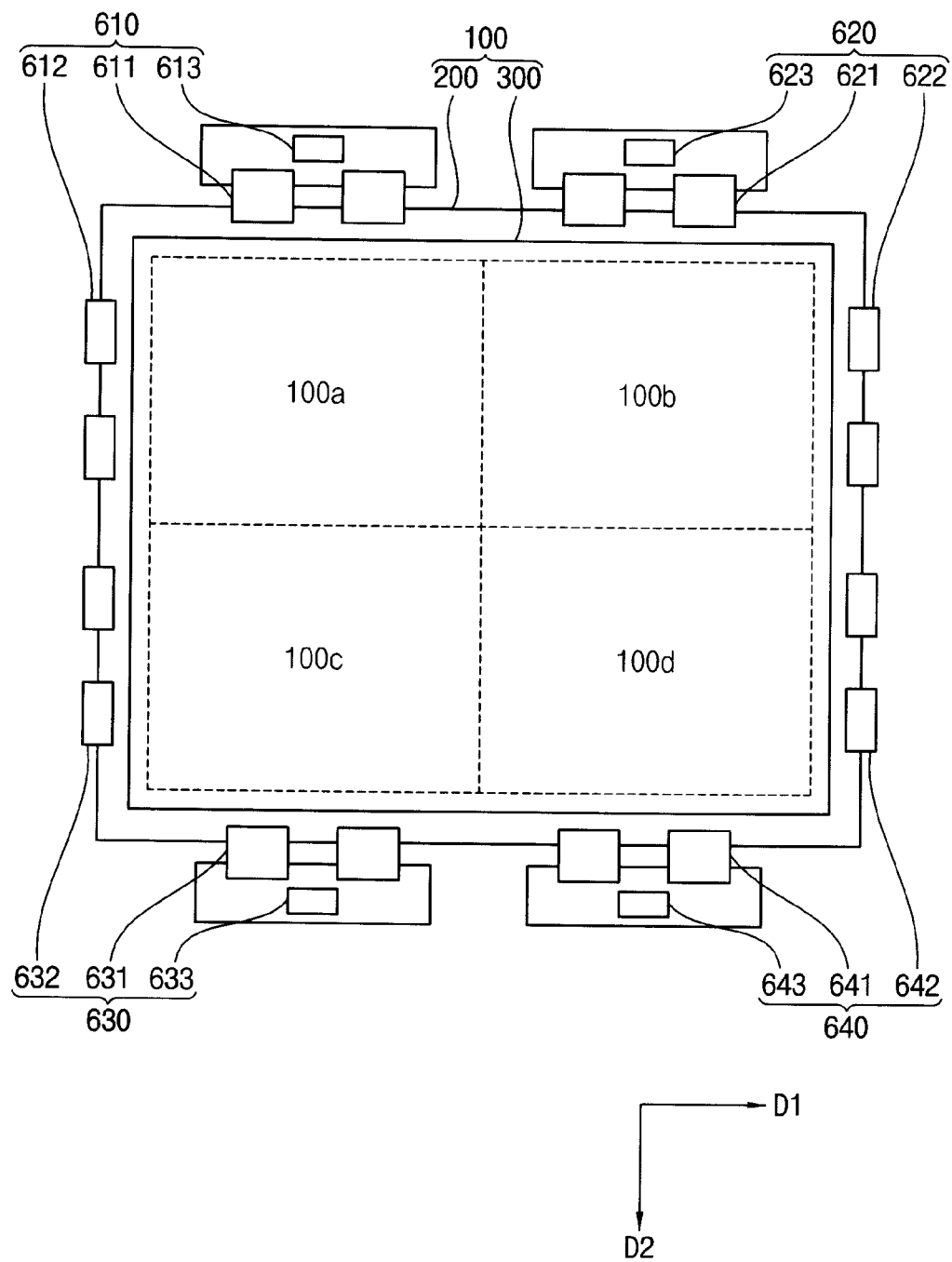
FIG. 1 is a plan view of a display panel according to an exemplary embodiment of the present invention.

The invention is described more fully hereinafter with reference to the accompanying drawings in which embodiments of the invention are shown. This invention may, however, be embodied in many different forms and should not be construed as limited to the embodiments set forth herein. Rather, these embodiments are provided so that this disclosure is thorough and will fully convey the scope of the invention to those skilled in the art. In the drawings, the size and relative sizes of layers and regions may be exaggerated for clarity Like reference numerals in the drawings denote like elements.

It will be understood that when an element or layer is referred to as being "on," "connected to," or "coupled to" another element or layer, it can be directly on, directly connected to, directly coupled to the other element or layer, or intervening elements or layers may be present. In contrast, when an element is referred to as being "directly on," "directly connected to," or "directly coupled to" another element or layer, there are no intervening elements or layers present.

Hereinafter, the exemplary embodiments will be explained in detail with reference to the accompanying drawings.

FIG. 1 is a plan view of a display panel according to an exemplary embodiment of the present invention.

Referring to FIG. 1, a display apparatus includes a display panel 100 and a plurality of driving parts 610, 620, 630 and 640 driving the display panel 100.

The display panel 100 includes a first display substrate 200 and a second display substrate 300 facing the first display substrate 100. The display panel 100 is electrically segmented into a plurality of display cells 100A, 100B, 100C and 100D. Each of the display cells 100A, 100B, 100C and 100D may have a size equal to or larger than 46 inches, and the display panel 100 may display a high resolution image using the display cells 100A, 100B, 100C and 100D. Smaller display cells of the less then 46 inches may also be used.

The driving parts 610, 620, 630 and 640 drive the display cells 100A, 100B, 100C and 100D, respectively. For example, the first driving part 610 includes a first data driving part 611 providing a data signal to the first display cell 100A, a first gate driving part 612 providing a gate signal to the first display cell 100A, and a first controller 613 controlling the first data driving part 611 and the first gate driving part 612. The second driving part 620 includes a second data driving part 621 providing a data signal to the second display cell 100B, a second gate driving part 622 providing a gate signal to the second display cell 100B, and a second controller 623 controlling the second data driving part 621 and the second gate driving part 622. The third driving part 630 includes a third data driving part 631 providing a data signal to the third display cell 100C, a third gate driving part 632 providing a gate signal to the third display cell 100C, and a third controller 633 controlling the third data driving part 631 and the third gate driving part 632. The fourth driving part 640 includes a fourth data driving part 641 providing a data signal to the fourth display cell 100D, a fourth gate driving part 642 providing a gate signal to the fourth display cell 100D, and a fourth controller 643 controlling the fourth data driving part 641 and the fourth gate driving part 642. The display panel 100 may be spatially divided and be driven using the driving parts 610, 620, 630 and 640 so that the display panel may be driven with a frequency equal to or larger than 60 Hz.

The first driving part 610 may be disposed at an upper left corner of the display panel 100. The second driving part 620 may be disposed at an upper right corner of the display panel 100. The third driving part 630 may be disposed at a lower left corner of the display panel 100. The fourth driving part 640 may be disposed at a lower right corner of the display panel 100. However, this configuration may be varied in many different ways as will be appreciated by one skilled in the art.

Figure 2:
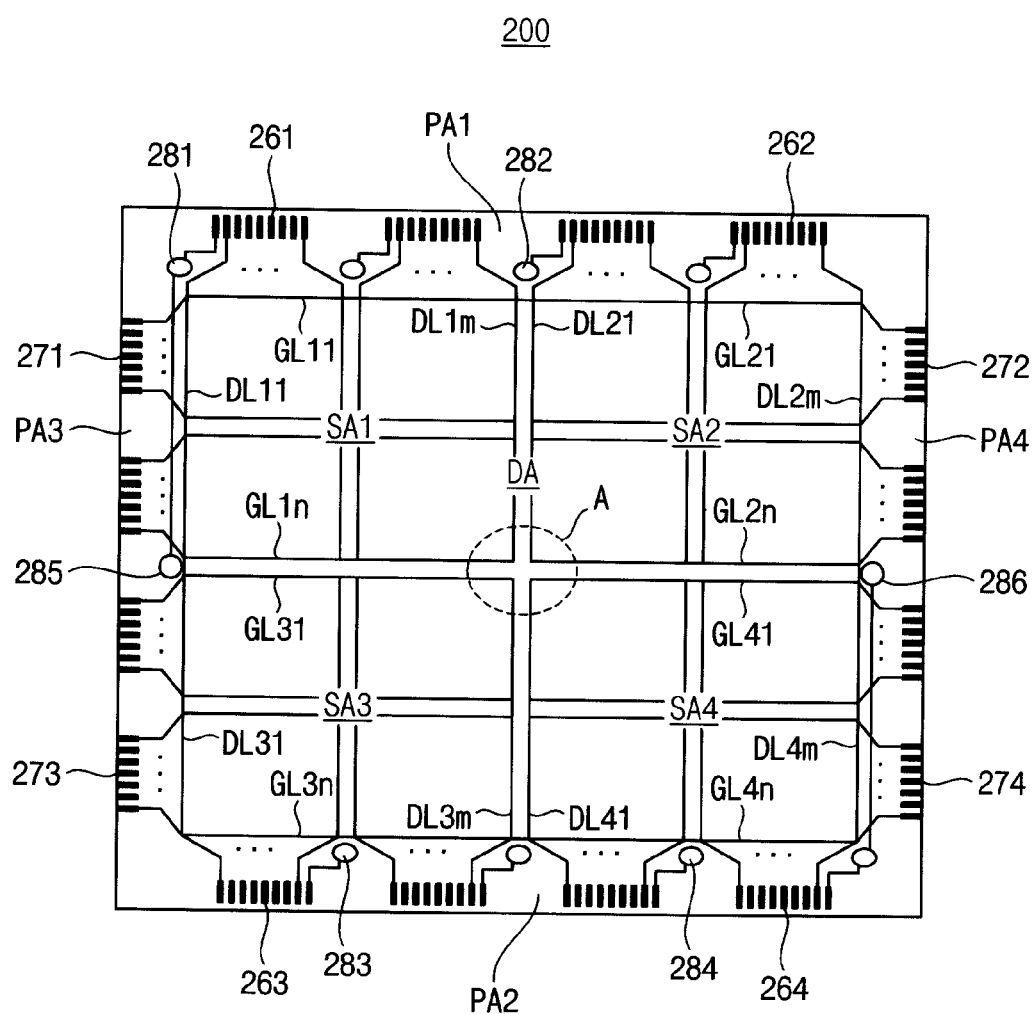
FIG. 2 is a plan view of a first display substrate of the display panel in FIG. 1.
Figure 2:
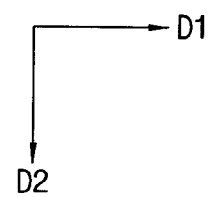

FIG. 2 is a plan view of a first display substrate of the display panel shown in FIG. 1

Referring to FIG. 1 and FIG. 2, the first display substrate 200 includes a display area DA, and first, second, third, and fourth peripheral areas PA1, PA2, PA3, and PA4 surrounding the display area DA.

A plurality of data lines, a plurality of gate lines and a plurality of pixel electrodes are formed in each of the display cells 100A, 100B, 100C, and 100D of the display area DA.

A plurality of first data lines DL11, . . . , DL1m, a plurality of first gate lines GL11, . . . , GL1n, and a plurality of first pixel electrodes not shown in the figures are formed in a first cell area SA1 of the display area DA corresponding to the first display cell 100A. A plurality of second data lines DL21, . . . , DL2m, a plurality of second gate lines GL21, . . . , GL2n, and a plurality of second pixel electrodes (not shown) are formed in a second cell area SA2 of the display area DA corresponding to the second display cell 100B. A plurality of third data lines DL31, . . . , DL3m, a plurality of third gate lines GL31, . . . , GL3n, and a plurality of third pixel electrodes (not shown) are formed in a third cell area SA3 of the display area DA corresponding to the third display cell 100C. A plurality of fourth data lines DL41, . . . , DL4m, a plurality of fourth gate lines GL41, . . . , GL4n, and a plurality of fourth pixel electrodes (not shown) are formed in a fourth cell area SA4 of the display area DA corresponding to the fourth display cell 100D.

The first data lines DL11, . . . , DL1m in the first cell area SA1 and the third data lines DL31, . . . , DL3m in the third cell area SA3 are spaced apart and electrically separated from each other. The first gate lines GL11, . . . , GL1n in the first cell area SA1 and the second gate lines GL21, . . . , GL2n in the second cell area SA2 are spaced apart and electrically separated from each other. The second data lines DL21, . . . , DL2m in the second area SA2 and the fourth data lines DL41, . . . , DL4m in the fourth cell area SA4 are spaced apart and electrically separated from each other. The third gate lines GL31, . . . , GL3n in the third cell area SA3 and the fourth gate lines GL41, . . . , GL4n in the fourth cell area SA4 are spaced apart and electrically separated from each other.

A first data pad part 261 on which the first data driving part 611 is mounted, a second data pad part 262 on which the second data driving part 621 is mounted, and a plurality of first short points 281 and 282 are formed in the first peripheral area PA1.

A third data pad part 263 on which the third data driving part 631 is mounted, a fourth data pad part 264 on which the fourth data driving part 641 is mounted, and a plurality of second short points 283 and 284 are formed in the second peripheral area PA2.

A first gate pad part 271 on which the first gate driving part 612 is mounted, a third gate pad part 273 on which the third gate driving part 632 is mounted, and a plurality of third short points 285 are formed in the third peripheral area PA3.

A second gate pad part 272 on which the second gate driving part 622 is mounted, a fourth gate pad part 274 on which the fourth gate driving part 642 is mounted, and a plurality of fourth short points 286 are formed in the fourth peripheral area PA4.

Thus, the first driving part 610 is mounted in the peripheral area adjacent to an upper left portion of the display area DA. The second driving part 620 is mounted in the peripheral area adjacent to an upper right portion of the display area DA. The third driving part 630 is mounted in the peripheral area adjacent to a lower left portion of the display area DA. The fourth driving part 640 is mounted in the peripheral area adjacent to a lower right portion of the display area DA.

A common voltage is applied to the first, second, third, and fourth short points 281, 282, 283, 285, and 286 from the first, second, third, and fourth controllers 613, 623, 633 and 643. The first, second, third, and fourth short points 281, 282, 283, 284, 285, and 286 are electrically connected to a common electrode of the second display substrate 300 and a common line electrically connected to the common electrode through a conductive member. The common voltage is applied to the second display substrate 300. The second display substrate 300 will be explained below FIG. 3 is a plan view of a second display substrate of the display panel shown in FIG. 1.

Figure 3:
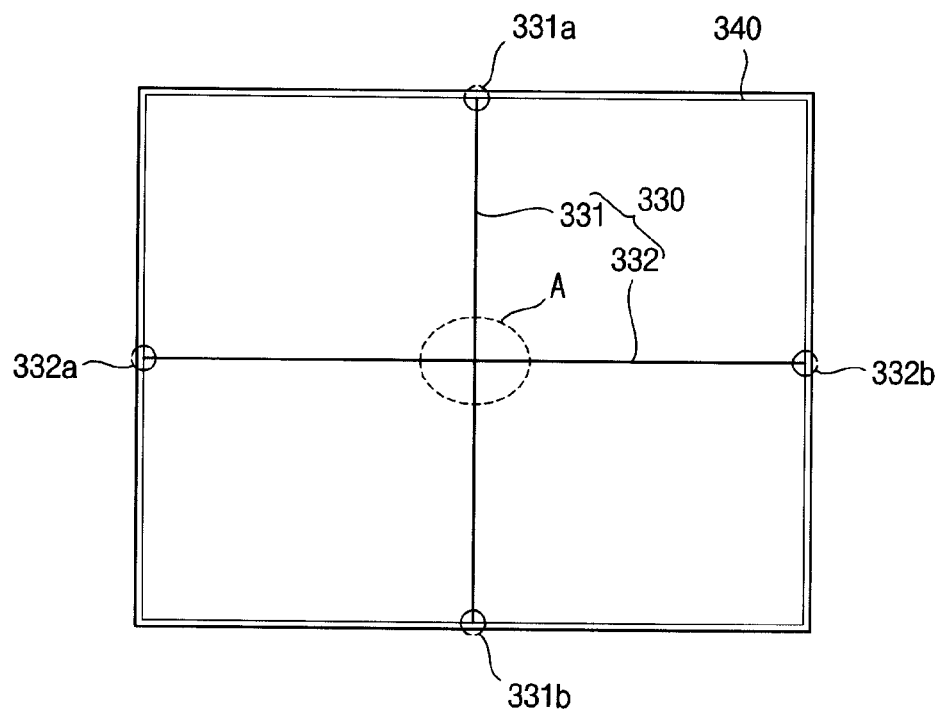
FIG. 3 is a plan view of a second display substrate of the display panel in FIG. 1.
Figure 3:
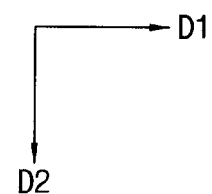

Referring to FIG. 1., FIG. 2, and FIG. 3, the second display substrate 300 includes a common line 330 and a common electrode 340.

The common line 330 includes at least one first line 331 dividing the whole area of the second display substrate 300 into a plurality of areas along a first direction D1 and at least one second line 332 dividing the whole area of the second display substrate 300 into a plurality of areas along a second direction D2. The first line 331 extends along the second direction D2, and the second line 332 extends along the first direction D1. The first and second lines 331 and 332 may include metal lines and are electrically connected to each other. For example, the common line 330 may be formed in an area corresponding to a boundary of the cell areas SA1, SA2, SA3, and SA4 of the first display substrate 200.

An end portion of the common line 330 may be electrically connected to at least one of the short points 281, 282, 283, 284, 285, and 286 of the first display substrate 200. For example, a first end portion 331A of the first line 331 may be electrically connected to the first short point 282, and a second end portion 331B of the first line 331 may be electrically connected to the second short point 283. A first end portion 332A of the second line 332 may be electrically connected to the third short point 285, and a second end portion 332B of the second line 332 may be electrically connected to the fourth short point 286. The common line 330 may include a metal, and, thus, a signal delay due to line resistance may be minimized so that the common voltage may be transmitted with a minimal signal delay.

The common electrode 340 may be formed in the whole area of the second display substrate 300 and electrically connected to the common line 330. A boundary of the common electrode 340 may be electrically connected to the short points 281, 282, 283, 284, 285, and 286 of the first display substrate 200. Accordingly, the common voltage may be uniformly applied to the common electrode 340 formed in the whole area of the second display substrate 300 without a delay time from application of voltage on the common electrode 400.

Figure 4:
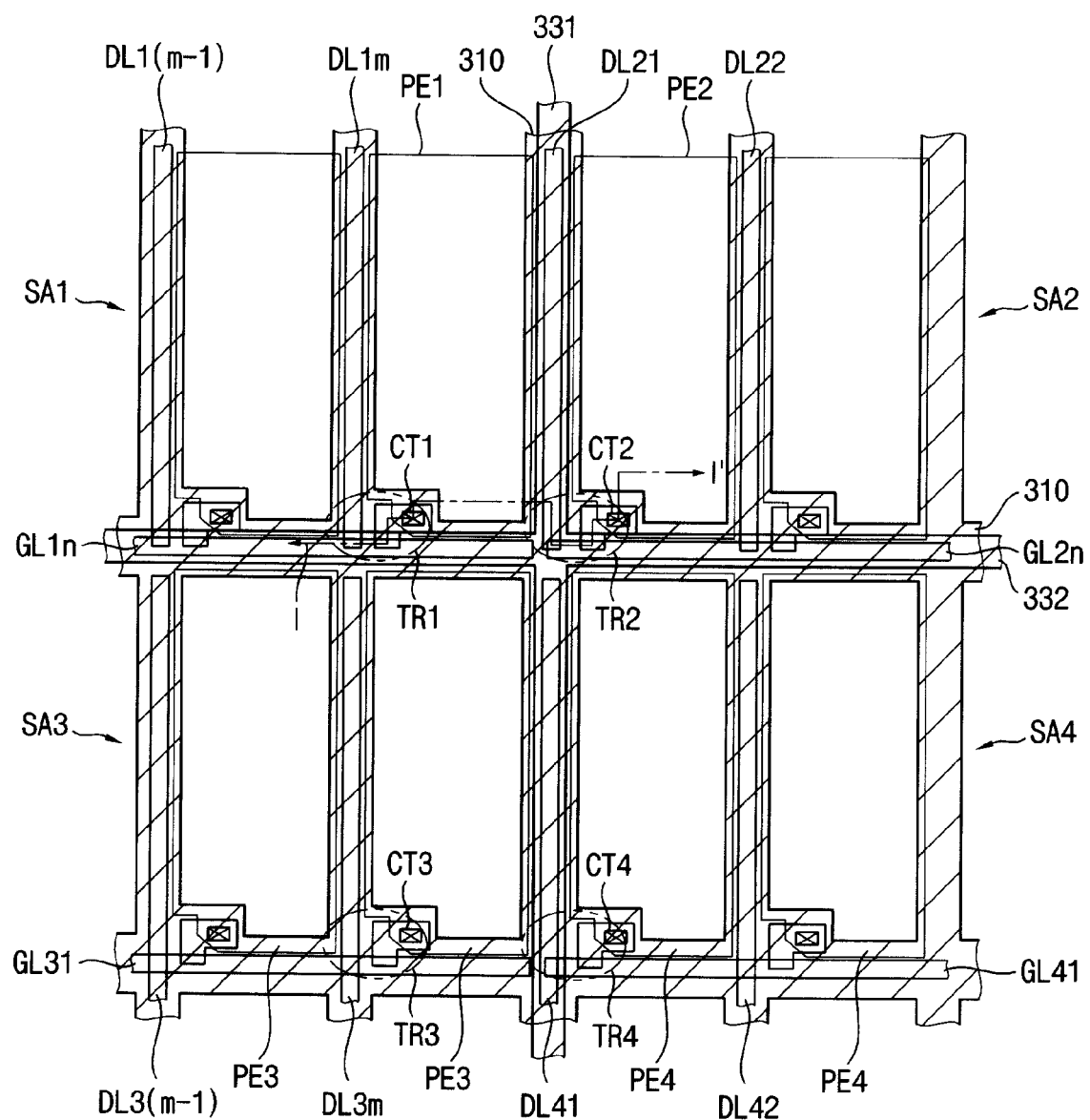
FIG. 4 is an enlarged plan view of a portion 'A' of FIG. 2 and FIG. 3.
Figure 5:
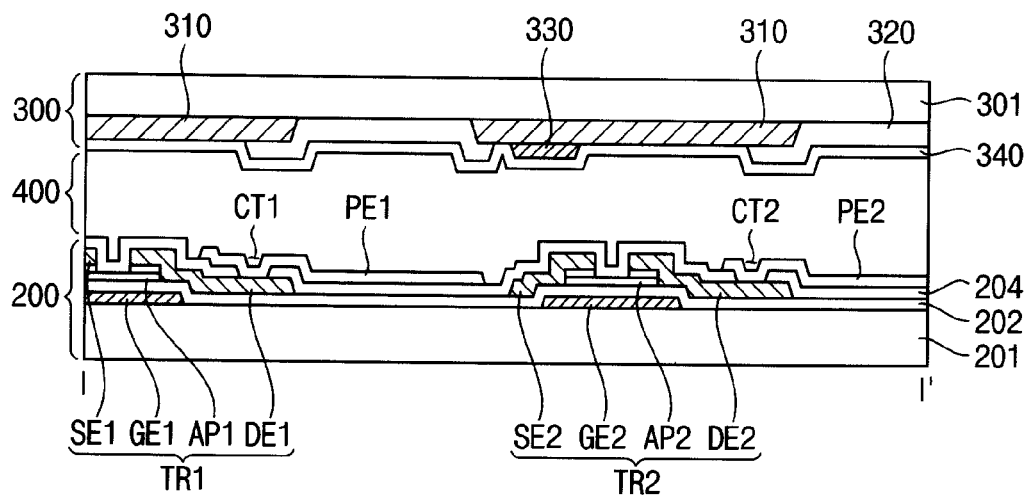
FIG. 5 is a cross-sectional view taken along line I-I' of FIG. 4.

FIG. 4 is an enlarged plan view of a portion 'A' shown in FIG. 2 and FIG. 3. FIG. 5 is a cross-sectional view of a display panel taken along line I-I' of FIG. 4.

Referring to FIG. 4 and FIG. 5, the display panel 100 includes the first display substrate 200, the second display substrate 300 and a liquid crystal layer 400.

The first display substrate 200 includes a first base substrate 201, a plurality of data lines, a plurality of gate lines, and a plurality of pixel electrodes. The data lines, the gate lines, and the pixel electrodes are formed on the first base substrate 201. The first display substrate 200 further includes a gate insulation layer 202 and a protective insulation layer 204. The gate insulation layer 202 is formed on a first metal pattern including the gate lines. The protective insulation layer 204 is formed on a second metal pattern including the data lines.

For example, an m-th data line DL1m, an n-th gate line GL1n, a switching element TR1, and a pixel electrode PE1 are formed in the first base substrate 201. The switching element TR1 includes a gate electrode GE1 connected to the n-th gate line GL1n, a source electrode SE1 connected to the data line DL1m, and a drain electrode DE1 connected to the pixel electrode PE1 through a first contact hole CT1. The switching element TR1 further includes a semiconductor pattern AP1 formed on the gate electrode GE1. The data line DL1m formed in the first cell area SA1 is spaced apart from an m-th data line DL3m formed in the third cell area SA3. The gate lines formed in the first cell area SA1, which are represented by the n-th gate line GL1n, are spaced apart from an n-th gate line GL2n formed in the second cell area SA2.

The first data line DL21, the n-th gate line GL2n, a switching element TR2, and a pixel electrode PE2 are formed in the second cell area SA2 of the first base substrate 201. The switching element TR2 includes a gate electrode GE2 connected to the n-th gate line GL2n, a source electrode SE2 connected to the first data line DL21, and a drain electrode DE2 connected to the pixel electrode PE2 through a second contact hole CT2. The switching element TR2 further includes a semiconductor pattern AP2 formed on the gate electrode GE2. The data lines formed in the second cell area SA2, which are represented by the first data line DL21, are spaced apart from a first data line DL41 formed in the fourth cell area SA4.

An m-th data line DL3m, a first gate line GL31, a switching element TR3, and a pixel electrode PE3 are formed in the third cell area SA3 of the first base substrate 201. The switching element TR3 includes a gate electrode connected to the first gate line GL31, a source electrode connected to the m-th data line DL3m, and a drain electrode connected to the pixel electrode PE3 through a third contact hole CT3. The switching element TR3 further includes a semiconductor pattern formed on the gate electrode. The data lines formed in the third cell area SA3, which are represented by the m-th data line DL3m, are spaced apart from the m-th data line DL1m formed in the first cell area SA1. The gate lines formed in the third cell area SA3, which are represented by the first gate line GL31, are spaced apart from the first gate line GL41 formed in the fourth cell area SA4.

A first data line DL41, the first gate line GL41, a switching element TR4, and a pixel electrode PE4 are formed in the fourth cell area SA4 of the first base substrate 201. The switching element TR4 includes a gate electrode connected to the first gate line GL41, a source electrode connected to the first data line DL41, and a drain electrode DE1 connected to the pixel electrode PE4 through a fourth contact hole CT4. The switching element TR4 further includes a semiconductor pattern formed on the gate electrode. The data lines DL41 formed in the fourth cell area SA4, which are represented by the first data line GL41, are spaced apart from the first data line DL21 formed in the second cell area SA2.

The second display substrate 300 includes a second base substrate 301. A light blocking pattern 310, a color filter 320, a common line 330, and a common electrode 340 are formed on the second base substrate 301.

The light blocking pattern 310 is formed on the second base substrate 301 corresponding to an area on which the data lines, the gate lines and the switching elements are formed.

The color filter 320 is formed on the second base substrate 301 corresponding to an area on which the pixel electrodes of the first display substrate 200 are formed. The color filter 320 may alternatively be formed in the first display substrate 200. When the first display substrate 200 includes the color filter 320, the color filter 320 may be formed between the protective insulation layer 204 and the pixel electrodes in the first display substrate 200.

The common line 330 overlaps the light blocking pattern 310 in an area where the light blocking pattern 310 is formed. The common line 330 includes a metal line which may be formed by patterning a metal layer. The common line 330 includes the first line 331 and the second line 332. The first line 331 extends along the second direction D2 coinciding with the length direction of the data line. The second line 332 extends along the first direction D1 coinciding with the length direction of the gate line. The first and second lines 331 are 332 are connected with each other.

As illustrated in FIG. 3, the common line 330 includes one first line 331 and one second line 332 crossing each other to form a cross shape. Alternatively, the common line 330 may include a plurality of first lines 331 and a plurality of second lines 332 crossing the first lines to form a matrix shape. In addition, the common line 330 may be formed in an area corresponding to a boundary between the cell areas. The common line 330 is formed in the area in which the light blocking pattern 310 is formed, and thus the aperture ratio and the light transmittance of the display panel 100 may not be affected.

The common electrode 340 is formed in the whole area of the second base substrate 301 on which the common line 330 is formed. The common electrode 340 may include a transparent conductive layer. The common electrode 340 contacts and is electrically connected to the common line 330 so that the common voltage applied to the common line 330 may be applied to the common electrode 340. For example, the common line 330 may decrease the signal delay of the common electrode 340 that includes the transparent conductive layer having a resistance higher than the metal layer. Accordingly, the common voltage may be uniformly transmitted to the whole area of the second display substrate 300 without increased signal delay. Thus, display quality may be improved.

FIG. 6A, FIG. 6B, FIG. 6C, and FIG. 6D are timing diagrams showing driving signals to explain a method of driving the display panel shown in FIG. 1.

Referring to FIG. 1, FIG. 6A, FIG. 6B, FIG. 6C, and FIG. 6D, the first, second, third, and fourth driving parts 610, 620, 630 and 640 are synchronized with each other and respectively drive the first, second, third, and fourth display cells 100A, 100B, 100C, and 100D.

Figure 6A:
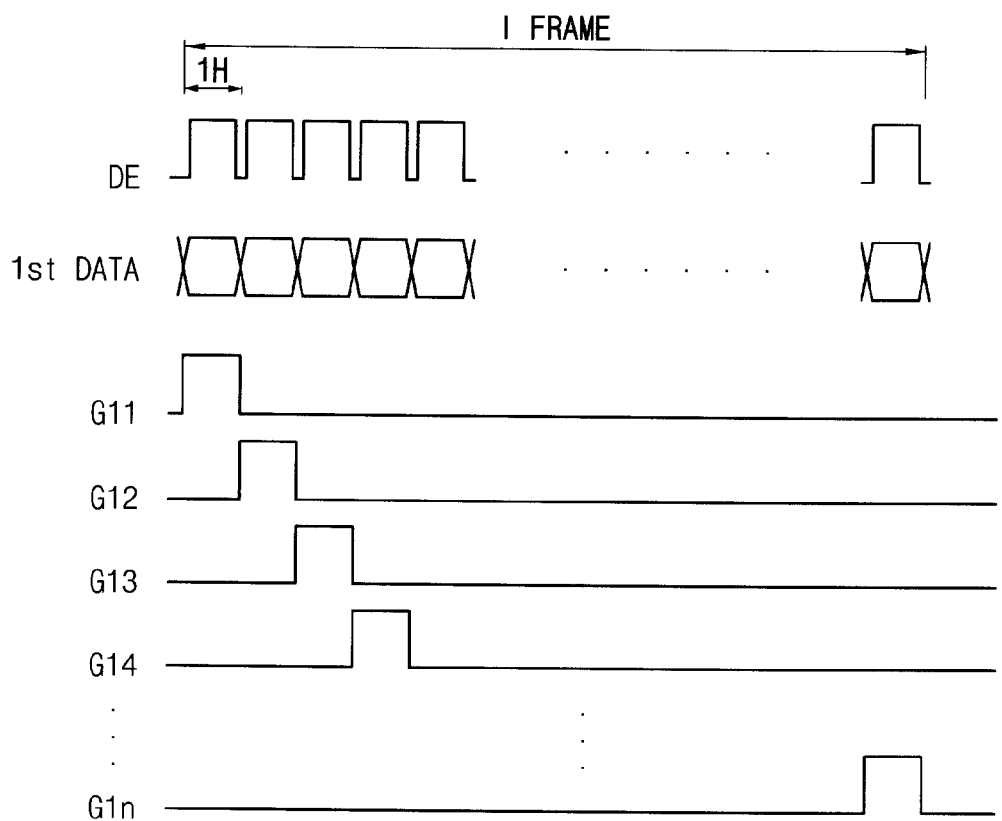
FIG. 6A, FIG. 6B, FIG. 6C, and FIG. 6D are timing diagrams showing driving signals to explain a method of driving the display panel shown in FIG. 1.

For example, referring to FIG. 1 and FIG. 6A, the first controller 613 generates a first data control signal and a first gate control signal that control the first driving part 610 using a received primitive control signal, for example, a data enable signal DE. Based on the first data control signal, the first data driving part 611 outputs first image data 1st DATA of the first display cell 100A to the data lines of the first display cell 100A during one horizontal period 1H. Based on the first gate control signal, the first gate driving part 612 generates the gate signals G11, G12, ..., G1n. The first gate driving part 612 sequentially outputs the gate signals G11, G12, ..., G1n to the gate lines of the first display cell 100A, synchronized with an output timing of the first image data 1st DATA.

Figure 6B:
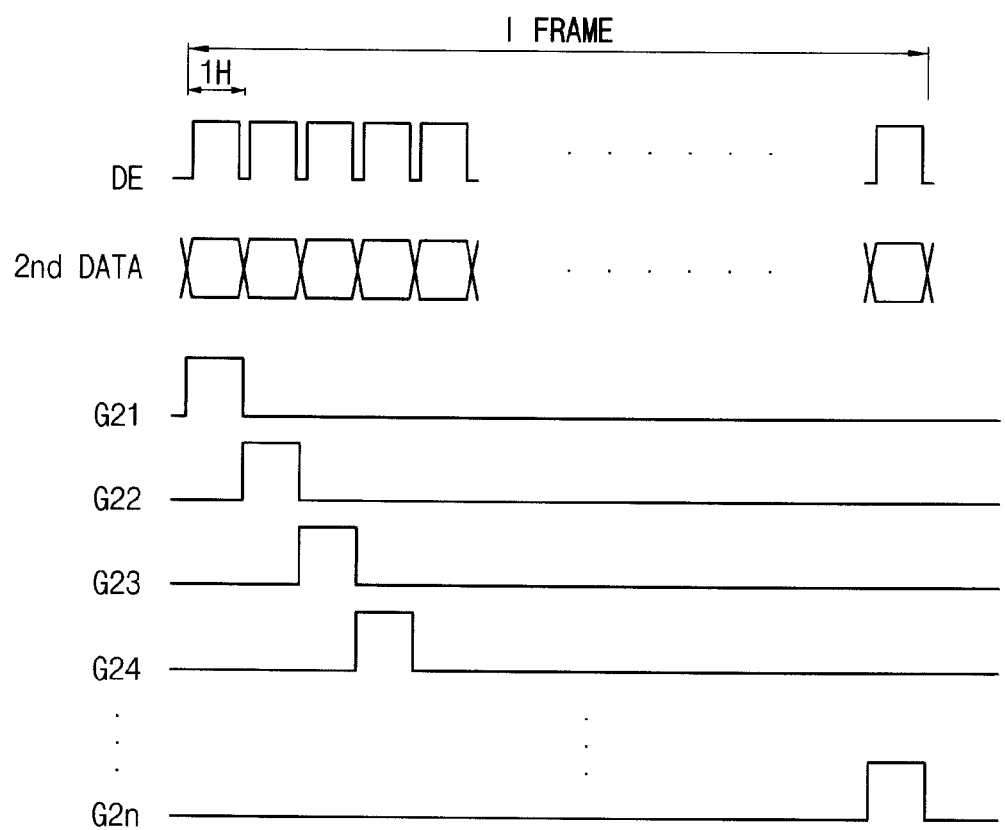

Referring to FIG. 1 and FIG. 6B, the second controller 623 generates a second data control signal and a second gate control signal that control the second driving part 620 using the data enable signal DE. Thus, the first driving part 610 and the second driving part 620 are synchronized with each other. Based on the second data control signal, the second data driving part 621 outputs second image data 2nd DATA of the second display cell 100B to the data lines of the second display cell 100B during one horizontal period 1H. Based on the second gate control signal, the second gate driving part 622 generates the gate signals G21, G22, ..., G2n. The second gate driving part 622 sequentially outputs the gate signals G21, G22, ..., G2n to the gate lines of the second display cell 100B, synchronized with an output timing of the second image data 2nd DATA.

Figure 6C:
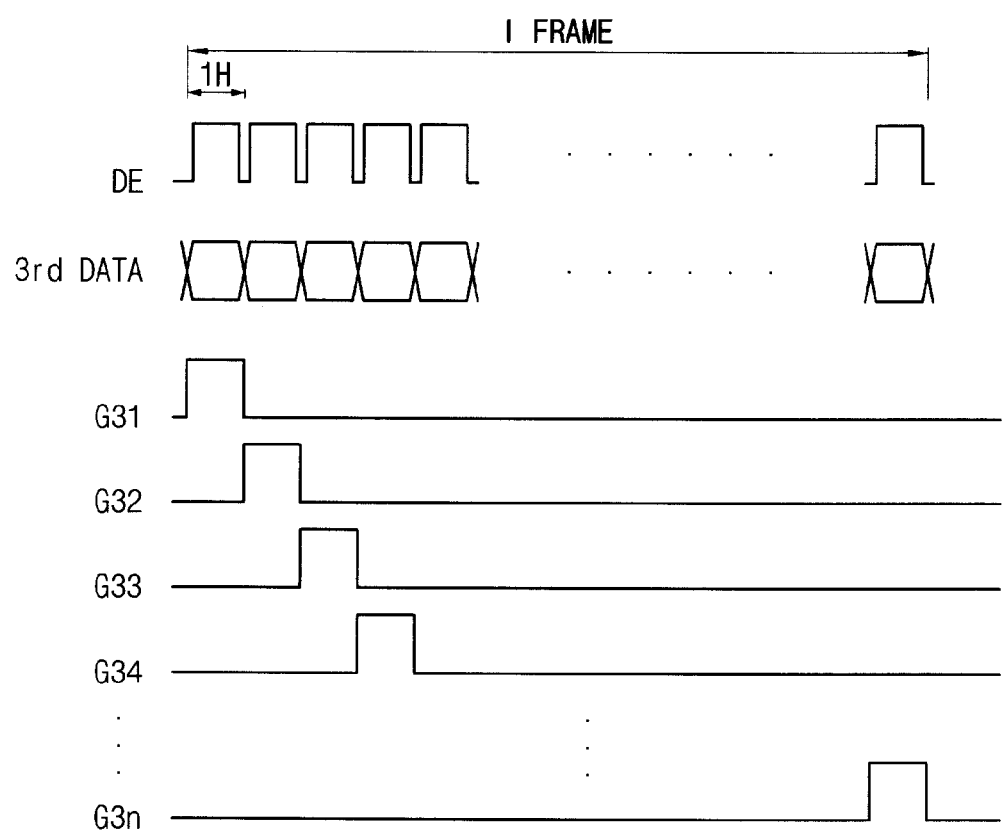

Referring to FIG. 1 and FIG. 6C, the third controller 633 generates a third data control signal and a third gate control signal that control the third driving part 630 using the data enable signal DE. Thus, the first, second and third driving parts 610, 620 and 630 are synchronized with each other. Based on the third data control signal, the third data driving part 631 outputs third image data 3rd DATA of the third display cell 100C to the data lines of the third display cell 100C during one horizontal period 1H. Based on the third gate control signal, the third gate driving part 632 generates the third gate signals G31, G32, ..., G3n. The third gate driving part 632 sequentially outputs the third gate signals G31, G32, ..., G3n to the gate lines of the third display cell 100C synchronized with an output timing of the third image data 3rd DATA.

Figure 6D:
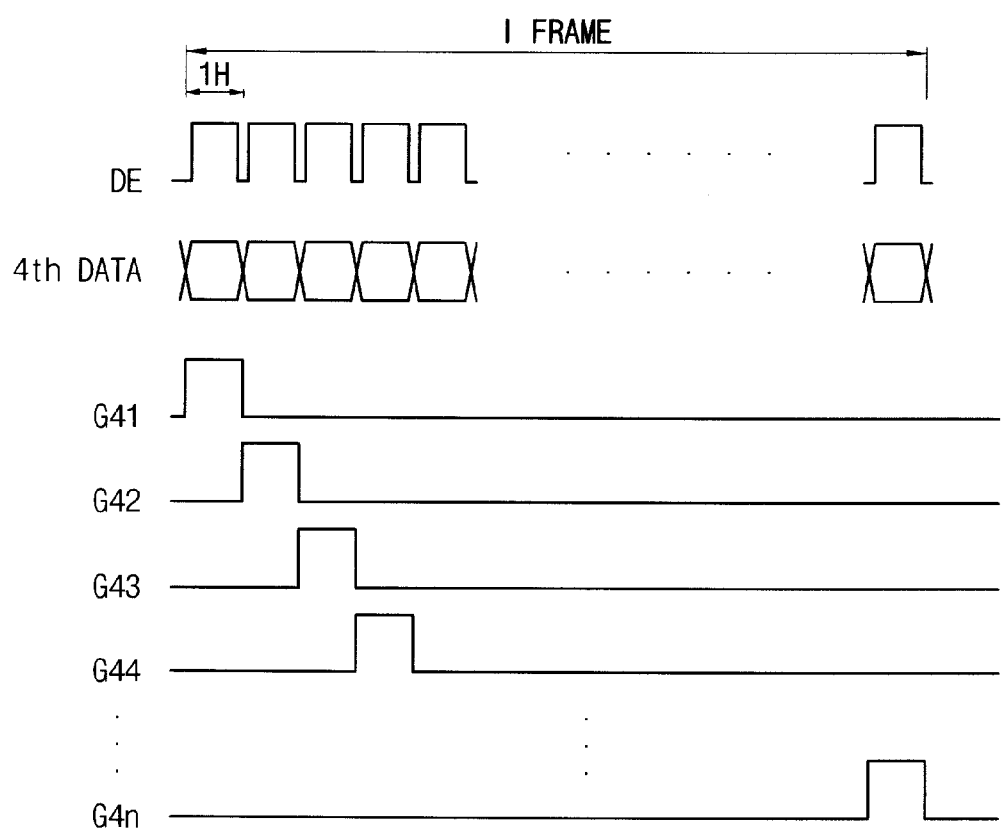

Referring to FIG. 1 and FIG. 6D, the fourth controller 643 generates a fourth data control signal and a fourth gate control signal that control the fourth driving part 640 using the data enable signal DE. Thus, the first, second, third, and fourth driving parts 610, 620, 630, and 640 are synchronized with each other. Based on the fourth data control signal, the fourth data driving part 641 outputs fourth image data 4th DATA of the fourth display cell 100D to the data lines of the fourth display cell 100D during one horizontal period 1H. Based on the fourth gate control signal, the fourth gate driving part 642 generates fourth gate signals G41, G42, ..., G4n. The fourth gate driving part 642 sequentially outputs the fourth gate signals G41, G42, ..., G4n to the gate lines of the fourth display cell 100D, synchronized with an output timing of the fourth image data 4th DATA.

Thus, when an image is displayed on a first horizontal line of the first display cell 100A, the images are displayed on each of first horizontal lines of the second, third and fourth display cells 100B, 100C and 100D. When the image is displayed on an n-th horizontal line of the first display cell 100A, the images are displayed on each of n-th horizontal lines of the second, third, and fourth display cells 100B, 100C and 100D.

Accordingly, the first, second, third, and fourth display cells 100A, 100B, 100C, and 100D of the display panel 100 may be individually driven, and display a large-sized screen image with a high frame frequency.

Figure 7:
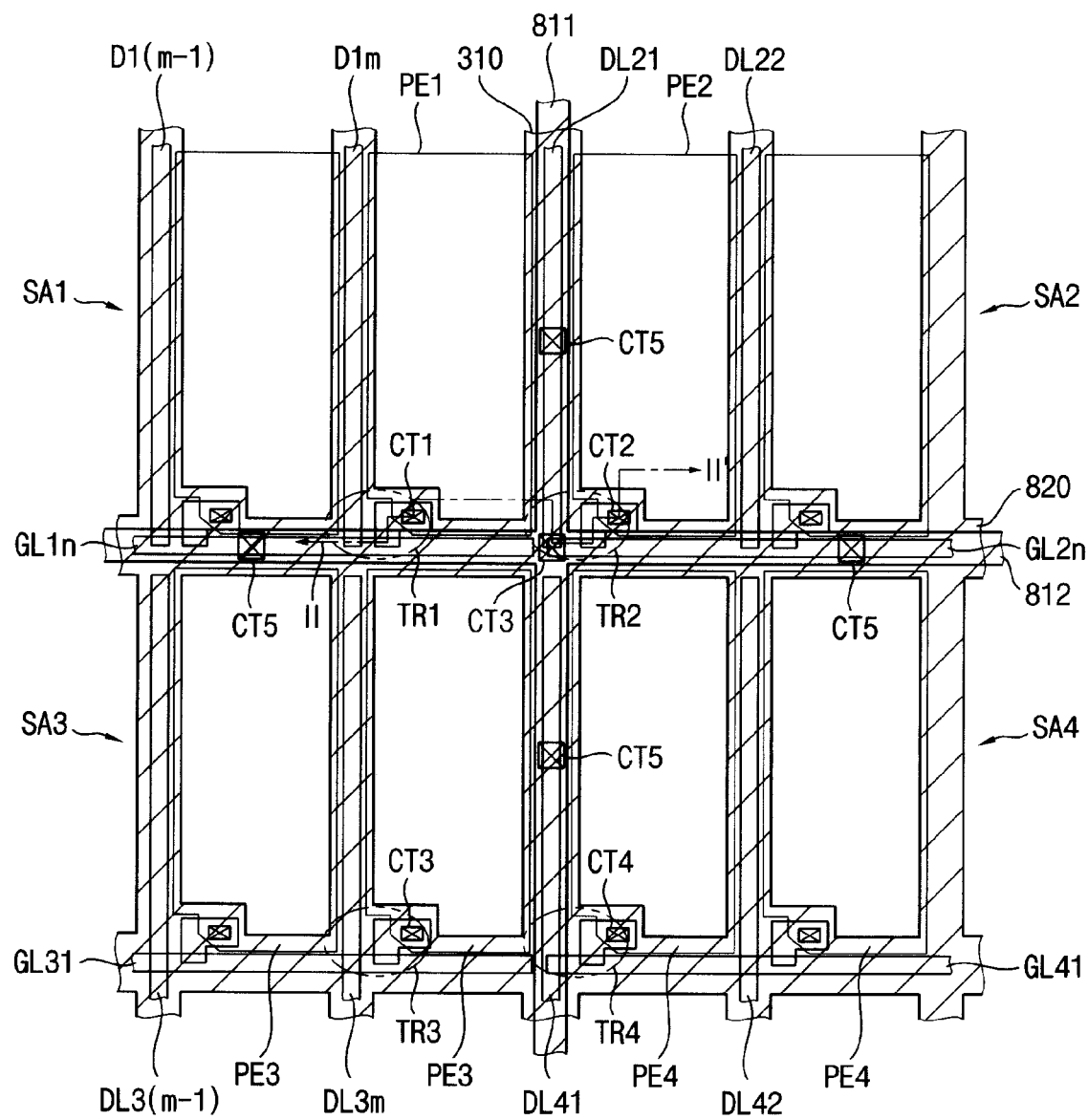
FIG. 7 is a plan view of a display panel according to another exemplary embodiment of the present invention.
Figure 8:
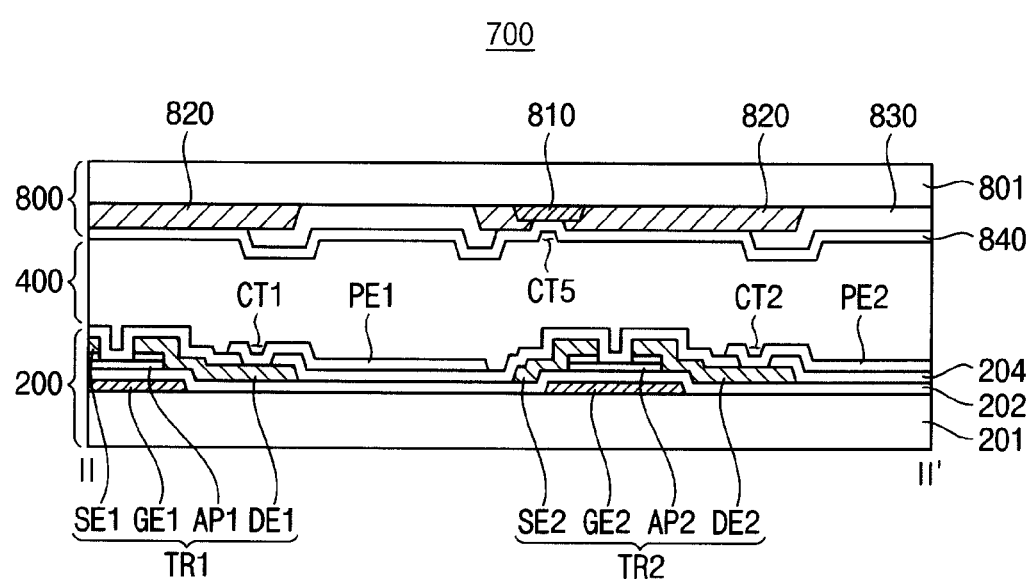
FIG. 8 is a cross-sectional view taken along line II-II' of FIG. 7.

FIG. 7 is a plan view of a display panel according to another exemplary embodiment of the present invention. FIG. 8 is a cross-sectional view of the display panel taken along line II-IF shown in FIG. 7.

Referring to FIG. 7 and FIG. 8, the display panel according to the present exemplary embodiment is similar to the previous exemplary embodiment shown in FIG. 4 and FIG. 5 except for its second display substrate. Thus, the same reference numerals will be used to refer to the same or like parts as those described in the previous exemplary embodiments and any further explanation concerning the above elements may be omitted.

The display panel 700 according to the present exemplary embodiment includes a first display substrate 200, a second display substrate 800 and a liquid crystal layer 400.

The second display substrate 800 includes a second base substrate 801. A common line 810, a light blocking pattern 820, a color filter 830, and a common electrode 840 are formed on the second base substrate 801.

The common line 810 is formed on the second base substrate 801 corresponding to a portion of an area in which the data and gate lines are formed on the first display substrate 200. The common line 810 may include a metal layer. The common line 810 includes a first line 811 extending along the second direction D2 corresponding to the length direction of the data lines, and a second line 812 extending along the first direction D1 corresponding to the length direction of the gate lines. The first and second lines 811 and 812 are connected with each other.

As illustrated in the figures, the common line 810 may include one first line 811 and one second line 812 crossing each other. Alternatively, the common line 810 may include a plurality of the first lines 811 and a plurality of the second lines 812 crossing the first lines in a matrix format.

The light blocking pattern 820 is formed on the second base substrate 801 corresponding to an area in which the data lines, the gate lines, and the switching elements are formed. The light blocking pattern 820 covers the common line 810 and may only partially overlap the common line 810 as shown in FIG. 8. A plurality of fifth contact holes CT5 partially exposing the common line 810 is formed through the light blocking pattern 820.

The color filter 830 is formed on the second base substrate 801 corresponding to an area in which the pixel electrodes, e.g., PE1 and PE2, of the first display substrate 200 are formed. Alternatively, the color filter 830 may be formed on the first display substrate 200. When the color filter 830 is formed on the first display substrate 200, the color filter 830 may be formed between the protective insulation layer 204 of the first display substrate 200 and the pixel electrodes.

The common electrode 840 is formed on the second base substrate 801 to cover the light blocking pattern 820 through which the fifth contact holes CT5 are formed and to cover the color filter 830. The common electrode 840 may include a transparent conductive layer.

The common electrode 840 is electrically connected to the common line 810 through the fifth contact holes CT5. A signal delay of the common electrode 840, which includes the transparent conductive layer, may be improved by connection to the common line 810 compared to instances without this configuration. Due to this design, the common voltage is uniformly applied to the common electrode 840 formed in the whole area of the second display substrate 800 without the delay difference. Thus, the display quality may be improved. In addition, the common line 810 may be formed in an area in which blocking pattern 820 is formed, and thus, the aperture ratio and the light transmittance of the display panel 100 may not be negatively impacted.

According to exemplary embodiments of the present invention, the display cells may be form on a single first display substrate, and the common electrode and the common line may be electrically connected to the common electrode and formed on a second display substrate. Thus, the frame border in the boundary between display cells is narrowed, and the delay difference of the common voltage may be minimized, so that the display quality may be improved. In addition, the display cells are individually driven to perform high resolution imaging with high speed driving frequencies.

It will be apparent to those skilled in the art that various modifications and variations can be made in the present invention without departing from the spirit or scope of the invention. Thus, it is intended that the present invention covers the modifications and variations of this invention provided they come within the scope of the appended claims and their equivalents. Therefore, it is to be understood that the foregoing is illustrative of the present invention and is not to be construed as limited to the specific exemplary embodiments disclosed, and that modifications to the disclosed exemplary embodiments are intended to be included within the scope of the appended claims.

What is claimed is:

1. A display panel, comprising:
   a first display substrate comprising:
      a first base substrate comprising a plurality of display cells;
      a plurality of data lines;
      a plurality of gate lines; and
      a plurality of pixel electrodes, the data lines, the gate lines, and the pixel electrodes being respectively separated in each of the display cells;
   a second display substrate comprising:
      a second base substrate;
      a light blocking pattern corresponding to the data lines and gate lines;
      a common electrode facing the pixel electrodes; and
      a common line overlapping the light blocking pattern; and
   a liquid crystal layer disposed between the first display substrate and the second display substrate.

2. The display panel of claim 1, wherein the common line comprises:
   at least one first line extending parallel to a length direction of the data lines; and
   at least one second line connected to the first line and extending parallel to a length direction of the gate lines.

3. The display panel of claim 2, wherein the common line is disposed on the second display substrate corresponding to a boundary between the display cells.

4. The display panel of claim 2, wherein the common line is disposed between the light blocking pattern and the common electrode and directly contacts the common electrode.

5. The display panel of claim 2, wherein the common line is disposed between the first base substrate and the light blocking pattern and directly contacts the common electrode through a contact hole in the light blocking pattern.

6. The display panel of claim 1, wherein the pixel electrodes are arranged in a display area of the first display substrate, the first display substrate further comprising:
   a peripheral area surrounding the display area; and
   a pad disposed in the peripheral area and configured to receive a driving signal to drive each of the display cells.

7. The display panel of claim 6, wherein the peripheral area comprises a plurality of short points to connect to the common electrode.

8. The display panel of claim 7, wherein an end portion of the common line is connected to at least one of the short points.

9. The display panel of claim 1, wherein the first display substrate comprises:
   a plurality of first data lines and a plurality of first gate lines disposed in a first display cell;
   a plurality of second data lines and a plurality of second gate lines disposed in a second display cell adjacent to the first display cell along a first direction, the second gate lines being separated from the first gate lines;
   a plurality of third data lines and a plurality of third gate lines disposed in a third display cell adjacent to the first display cell along a second direction, the third data lines being separated from the second data lines; and
   a plurality of fourth data lines and a plurality of fourth gate lines disposed in a fourth display cell adjacent to the third display cell and the second display cell along the first direction, the fourth gate lines being separated from the third gate lines.

10. The display panel of claim 9, wherein the common line is disposed on the second display substrate corresponding to the first display cell, the second display cell, the third display cell, and the fourth display cell.

11. A display apparatus, comprising:
   a display panel comprising a first display substrate,
      the first display substrate comprising:
         a first base substrate;
         a plurality of data lines;
         a plurality of gate lines; and a plurality of pixel electrodes, the first base substrate comprising a display area comprising a plurality of display cells and a peripheral area surrounding the display area, the data lines, the gate lines, and the pixel electrodes being respectively separated in each of the display cells;

a second display substrate comprising:
 a second base substrate;
 a light blocking pattern;
 a common electrode; and
 a common line, the light blocking pattern corresponding to the data lines and the gate lines, the common electrode facing the pixel electrodes, the common line overlapping with the light blocking pattern; and a plurality of driving parts arranged in the peripheral area of the display panel and configured to drive the pixel electrodes of each of the display cells.

12. The display apparatus of claim 11, wherein the driving parts comprise:
 a first driving part arranged in the peripheral area adjacent to a first display cell disposed at an upper left portion of the display area, the first driving part being electrically connected to a plurality of first data lines and a plurality of first gate lines in the first display cell;
 a second driving part arranged in the peripheral area adjacent to a second display cell disposed at an upper right portion of the display area, the second driving part being electrically connected to a plurality of second data lines and a plurality of second gate lines in the second display cell;
 a third driving part arranged in the peripheral area adjacent to a third display cell disposed at a lower left portion of the display area, the third driving part being electrically connected to a plurality of third data lines and a plurality of third gate lines in the third display cell; and
 a fourth driving part arranged in the peripheral area adjacent to a fourth display cell disposed at a lower right portion of the display area, the fourth driving part being electrically connected to a plurality of fourth data lines and a plurality of fourth gate lines in the fourth display cell.

13. The display apparatus of claim 12, wherein the common line is disposed in the second display substrate corresponding to a boundary between the first display cell, the second display cell, the third display cell, and the fourth display cell.

14. The display apparatus of claim 11, wherein the common line comprises:
 at least one first line extending parallel to a length direction of the data lines; and
 at least one second line connected to the first line and extending parallel to a length direction of the gate lines.

15. The display apparatus of claim 14, wherein the common line is disposed between the light blocking pattern and the common electrode and directly contact with the common electrode.

16. The display apparatus of claim 14, wherein the common line is disposed between the first base substrate and the light blocking pattern and directly contacts the common electrode through a contact hole in the light blocking pattern.

17. The display apparatus of claim 11, further comprising:
 a plurality of short points disposed in the peripheral area and configured to receive a common voltage from the driving parts.

18. The display apparatus of claim 17, wherein an end portion of the common line is connected to at least one of the short points.

19. The display apparatus of claim 11, wherein the common line is disposed on the second display substrate corresponding to a boundary between the display cells.

20. A display apparatus, comprising:
 a first display substrate comprising:
  a first base substrate comprising at least four display cells;
  a plurality of data lines;
  a plurality of gate lines; and
  a plurality of pixel electrodes, the data lines, the gate lines, and the pixel electrodes being respectively separated in each of the display cells;
 a second display substrate facing the first display substrate and comprising a common line; and
 a liquid crystal layer disposed between the first display substrate and the second display substrate,
 wherein each of the display cells comprises a plurality of pixels.

* * * * *